United States Patent [19]
Chen

[11] 3,885,572
[45] May 27, 1975

[54] QUICK DISCHARGE CIRCUIT FOR PACER NUCLEAR POWER SUPPLY

[75] Inventor: Chieh Yang Chen, Billerica, Mass.

[73] Assignee: American Optical Corporation, Southbridge, Mass.

[22] Filed: Nov. 30, 1973

[21] Appl. No.: 420,411

[52] U.S. Cl. .................... 128/419 P; 320/1; 321/12
[51] Int. Cl. ............................................. A61n 1/36
[58] Field of Search ........ 128/419 D, 419 P, 419 R, 128/422; 321/2, 12, 45 S, 320/1

[56] References Cited
UNITED STATES PATENTS

| | | | |
|---|---|---|---|
| 3,012,181 | 12/1961 | Schultz | 320/1 |
| 3,127,551 | 3/1964 | Lingle | 320/1 |
| 3,381,202 | 4/1968 | Loueks et al. | 320/1 |
| 3,389,704 | 6/1968 | Buchowski et al. | 128/419 D |
| 3,649,367 | 3/1972 | Purdy | 128/419 P |

OTHER PUBLICATIONS
Davies, "Journal of the British Institute of Radio Engineers," Vol. 24, No. 6, December 1962, pp. 453–456.

*Primary Examiner*—William E. Kamm
*Attorney, Agent, or Firm*—Joel Wall; William C. Nealon; H. R. Berkenstock, Jr.

[57] ABSTRACT

A quick discharge circuit for a pacer's nuclear power supply. A pacer capable of implantation within the body of a patient and capable of being powered by at least one nuclear battery is disclosed. Voltage from a single nuclear battery is increased by a factor of about 25 to 30 in order to provide a voltage level adequate to power pacer circuitry. A restartable DC-DC converter is used for this purpose. But if the converter malfunctions the load voltage must be reduced below a certain level for the converter to be automatically restarted. The present invention relates to means for reducing the time from converter malfunction to resumption of converter operation in order to reduce the corresponding inoperative pacer time period.

7 Claims, 4 Drawing Figures

QUICK DISCHARGE CIRCUIT FOR PACER NUCLEAR POWER SUPPLY

BACKGROUND OF THE INVENTION

1. Field of the Invention

The present invention relates in general to medical-electronics arts. More particularly, the present invention relates to implantable heart stimulating devices, commonly termed heart pacers, which are powered by the combination of a nuclear battery and DC-DC voltage converter.

2. Description of Prior Art

Heart stimulating devices have been known for some time. Several years ago heart stimulating devices which provide stimulation at a fixed or constant rate were developed. They were deficient in the respect that they created competitive problems with the natural or spontaneous heartbeat. More recently, heart stimulating devices which supply stimulation to the heart only when required have been developed, and these pacers solved the competition problem. And even more recently, heart pacers that supply stimulation only when required and in proper sequence to two chambers of the heart, the atrium and ventricle, have been developed.

In all pacers designed for use within the body of a patient whose heart is to be stimulated, a portable power supply is necessary. Ordinarily, a battery power supply is used, where it is desirable for battery life to be of long duration. For example, pacer batteries of chemical composition can be operative for as long as two years or more. More recently, nuclear batteries have been developed. A nuclear battery is a device which utilizes a controlled nuclear reaction as an energy source and converts this energy into an electrical energy output. The life of a nuclear battery may be as long as 10 years or more.

There are certain technical problems involved with nuclear batteries which include careful radioactive shielding, low voltage output, etc. Low voltage output from a nuclear battery which is approximately 0.3 or 0.4 volts, must be converted to higher voltage in order to power pacer circuitry, and typically, DC-DC converters are employed for this purpose. DC-DC converters are not new devices, and generally use an oscillator to change input DC voltage to chopped DC voltage, (a form of AC voltage), and then transformer couple this chopped or AC voltage either up or down. In the case of a nuclear battery or cell, where output voltage is about 400 millivolts, the DC-DC converter transformer couples upward to approximately 6 or 8 volts DC. The DC-DC converter output generally includes a capacitor thereacross as a filter. The load being powered by the converter may also have certain capacitors.

If the oscillator portion, for example, of the converter circuitry malfunctions, the converter circuitry will generally not restart until it's output or load voltage falls below a certain value. This value is defined by biasing constraints of the particular DC-DC converter circuitry that is used. For example, a particular configuration requires a discharge to 300 millivolts below the nuclear battery terminal voltage. Because of the capacitance mentioned in the above paragraph, it may be a considerable time before the output or load voltage drops below this required minimum value. In the prior art, as many as 25 or 30 seconds or more could elapse before the DC-DC converter would restart. This time lapse corresponds to approximately 25 or 30 stimulation impulses which may have been needed by a patient and which were not received. This was a severe problem for patients using prior art pacers utilizing this power supply comprising a nuclear cell and a DC-DC converter. The present invention solves this problem by substantially reducing this discharge time and thereby permitting quick resumption of converter and pacer operation.

SUMMARY OF THE INVENTION

The present invention relates to a circuit for rapidly discharging load and other capacitors electrically connected across the output of a nuclear battery/DC-DC converter combination power supply when the supply fails, but otherwise does not excessively drain the supply. The quick discharge circuitry comprises voltage sensing circuitry to indicate the status of operation of the DC-DC converter. The quick discharge circuitry also establishes different voltage ranges and controls rate of discharge of the capacitors as a function of the range in which the capacitors' voltage lies.

The circuitry includes a field effect transistor (FET) in combination with a voltage divider and biasing circuitry. The voltage divider is connected across the capacitors. The division node of the divider is connected to the source terminal of the field effect transistor. The drain terminal of the FET is connected to the positive terminal of the capacitors and the gate electrode is connected through a resistor to the negative terminal of the capacitors. The voltage divider action maintains the drain-source resistance of the FET very high when the power supply is operative, but causes the FET to assume a constant current state when the power supply malfunctions.

The present invention also relates to an improved heart stimulating device or pacer, wherein the pacer is powered by a nuclear battery/DC-DC converter power supply system. The improved nuclear powered pacer includes means for automatically and rapidly restoring proper functioning of the supply system for certain malfunctionings of the supply system.

Accordingly, it is advantageous for a patient requiring therapeutic heart stimulation to select a nuclear powered pacer incorporating the present invention; thereby, the patient will not be subjected to adverse effects of relatively-long pacer inoperative periods resulting from DC-DC converter malfunction.

It is thus an object of the present invention to provide an improved heart stimulating device.

It is another object of the present invention to provide an improved implantable nuclear powered heart stimulating device.

It is a further object of the present invention to provide a quick-discharge circuit for use with the power supply of a nuclear-powered heart pacer.

DESCRIPTION OF THE PREFERRED EMBODIMENT

Figure 1:
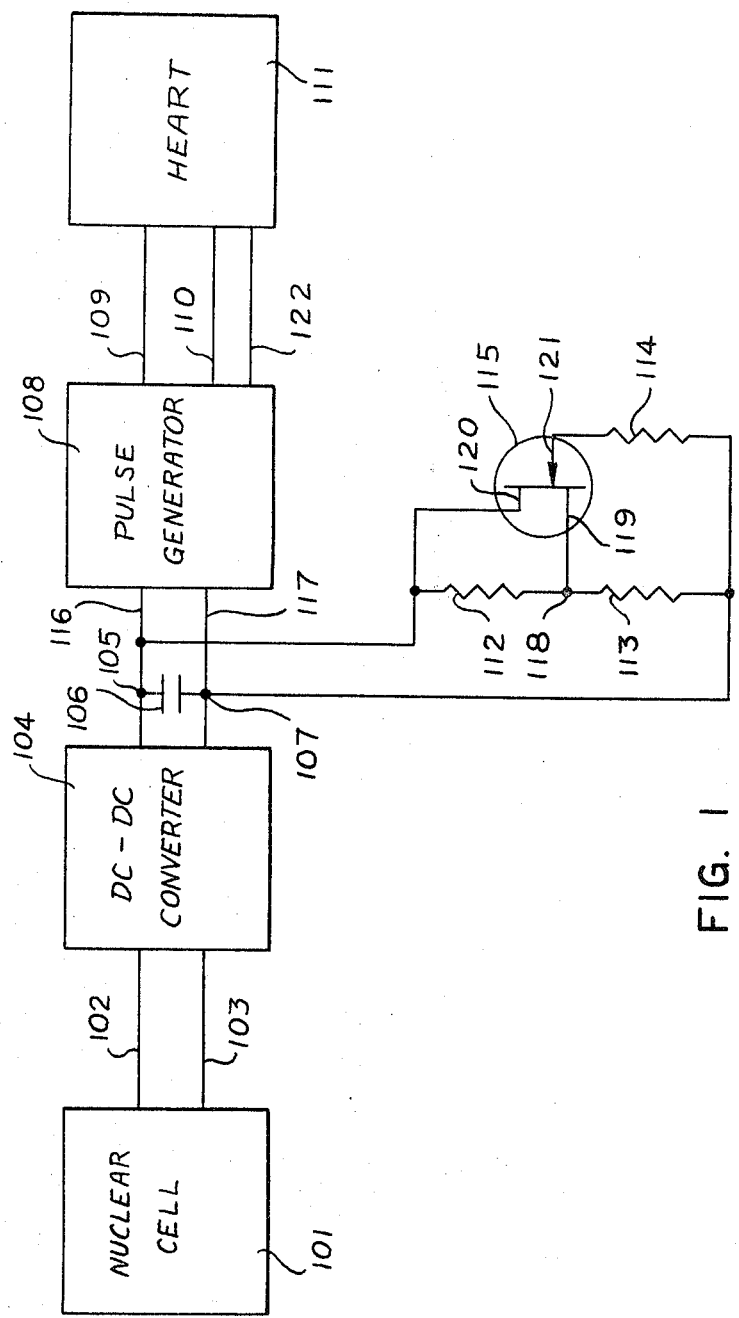
FIG. 1 depicts an illustrative embodiment of the present invention.

Referring to FIG. 1, nuclear cell (or nuclear battery) 101 provides electrical power output on conductors 102 and 103 to restartable DC-DC converter 104. Nuclear cell voltage output is usually about 400 millivolts. DC-DC converter 104 is of ordinary design, and could be for example a class C Hartley type oscillator incorporating a step-up transformer to provide an output of about 6 to 8 volts DC. If the converter fails, it is restartable, (or self-starting), if certain voltage conditions are met which are described below.

Output voltage from DC-DC converter 104 is extended on conductors 116 and 117 to other circuitry including capacitor 106 and pulse generator 108. This capacitor is intended to represent any output capacitance of DC-DC converter 104 and any capacitance of pulse generator 108 which would effectively appear between conductors 116 and 117. Terminals 105 and 107, connected respectively to conductors 116 and 117, are respectively referred to as positive and negative terminals of capacitor 106. Conductors 116 and 117 extend to pulse generator 108, which is a load. The output from pulse generator 108 is extended on conductors 122, 109 and 110 to heart 111, and can be stimulation impulses for stimulating heart 111 and causing it to beat.

Pulse generator 108 may be comprised of circuitry (excluding battery circuitry) disclosed in U.S. Pat. No. 3,528,428, with possible minor circuitry changes to accommodate conductors 116 and 117, and such portion of this patent is hereby incorporated by reference. Similarly, pulse generator 108 could be comprised of circuitry (excluding battery circuitry) disclosed in U.S. Pat. No. 3,595,242 with possible minor circuitry changes to accommodate conductors 116 and 117, and such portion of this latter patent is also hereby incorporated by reference. Of course, less sophisticated, constant rate pulse generators could also be utilized as pulse generator 108.

The other circuitry connected to conductors 116 and 117 represents the quick discharge portion of an illustrative embodiment of the present invention. Conductor 116 (or terminal 105) is connected to both one end of resistor 112 and to drain electrode 120 of FET 115. The other end of resistor 112 is connected to both source electrode 119 of FET 115 and one end of resistor 113. The other end of resistor 113 is connected to both negative terminal 107 (or conductor 117) and one end of resistor 114. The other end of resistor 114 is connected to gate electrode 121 of FET 115. FET 115 in the preferred embodiment is selected to be an N-channel silicon junction device. Field effect transistors have been commercially available for about ten years, and thus no extensive description of operation of a FET is deemed necessary. The present invention can be completely understood without a detailed FET description.

In operation, first consider normal functioning of the power supply. Nuclear cell 101 as mentioned earlier generates a first low DC voltage level to DC-DC converter 104 which increases the DC voltage level to a second voltage level compatible with operating requirements of pulse generator 108. This second voltage level is also registered on capacitor 106. The voltage on capacitor 106 is extended across resistors 112 and 113 which operate as a voltage divider. The voltage at node or junction 118 is extended to source electrode 119 of FET 115. The values of resistors 112 and 113 are selected to provide a sufficiently large voltage across resistor 113 to maintain FET 115 virtually turned off. Also, resistors 112 and 113 in series are sufficiently high for the drainage in normal operation from capacitor 106 to be minimal, and pulse generator 108 operates as designed.

Figure 2:
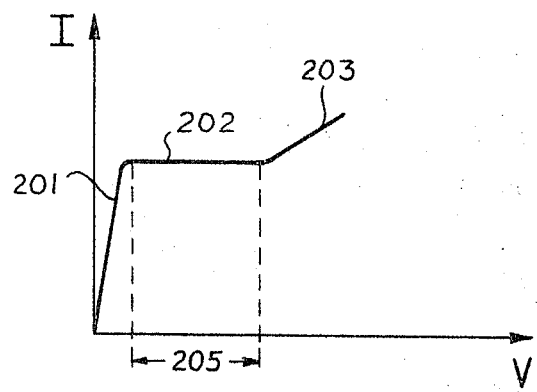
FIG. 2 depicts a current-voltage curve that is characteristic of the present invention.
Figure 3:
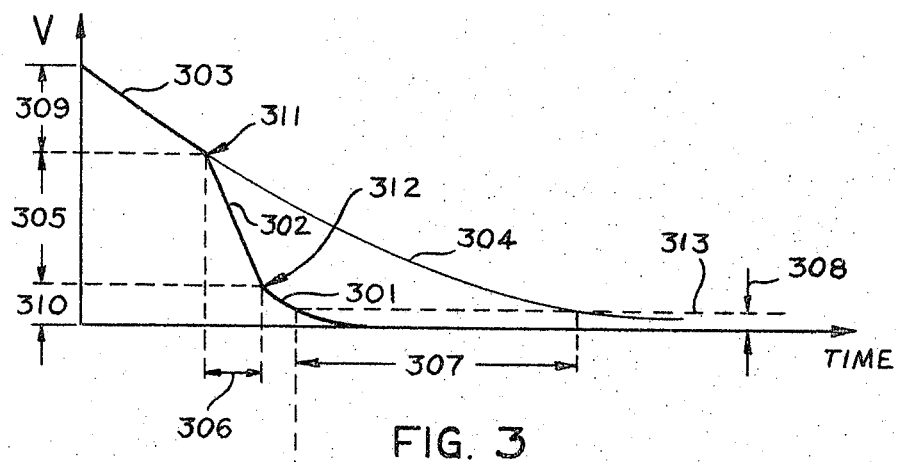
FIG. 3 depicts a voltage-time curve illustrating the quick-discharge characteristic of the present invention.

But, on the other hand, consider the effects of a malfunction of DC-DC converter 104, where output voltage on capacitor 106 begins to decrease. In connection with this situation consider both FIG. 2 and FIG. 3. FIG. 2 depicts a current/voltage characteristic of the quick discharge circuitry. FIG. 3 depicts a voltage/time discharge characteristic for capacitor 106 (and thus for output voltage of DC-DC converter 104) if the discharge resistance is constant. However, in certain cases, pulse generator 108 is equivalent to a resistive load which changes in value; i.e.: a switching resistive load. The corresonding discharge curve would thus resemble a "staircase" waveshape. However, FIG. 3 depicts a smooth discharge for purposes of clarity of illustration and this does not impair full understanding of the present invention.

Voltage on capacitor 106 begins to decrease as indicated by waveshape segment 303 in FIG. 3. Discharge of this capacitor is by resistors 112 and 113, and by any equivalent resistance (not shown) associated with pulse generator 108 and DC-DC converter 104 which is in parallel connection with capacitor 106. Segment 303 of FIG. 3 corresponds in voltage to waveshape segment 203 of FIG. 2. During the time corresponding to segment 303, FET 115 is still biased virtually off because voltage across resistor 113 is still too great to permit turn on of FET 115. However, at a time corresponding to point 311 in the discharge curve of FIG. 3, FET 115 does turn on. The effect of turn-on of FET 115 is to provide an impedance which has a characteristic of permitting a substantially constant current to flow therethrough. In other words, it acts like a constant current device to discharge capacitor 106 until capacitor voltage drops to what is termed "pinch-off voltage" of FET 115. The pinch off voltage is reached at point 312 on the discharge characteristic of FIG. 3 and corresponds to that voltage indicated by reference numeral 310. Thus, waveshape segment 302 is depicted as being an approximately straight line to indicate essentially constant current discharge; (ideally, $dV/dt = $ constant, and therefore discharge current from capacitor 106 equals another constant). Curve segment 302 in FIG. 3 corresponds to the curve segment 202 in FIG. 2. Segment 202, being substantially a horizontal line, indicates that discharge current is approximately constant for voltage range 205. Voltage range 205 and voltage range 305 are intended to be equal.

After pinch off is reached, source-drain resistance of FET 115 becomes comparatively small and effectively short circuits resistor 112. The discharge time constant is thus determined by capacitor 106 and essentially resistor 113 in parallel with effective converter and pulse generator resistances. Waveshape characteristic 301 in FIG. 3 is intended to represent capacitive discharge toward zero volts determined essentially by this time constant. And accordingly, voltage corresponding to waveshape segment 201 is intended to be equal to voltage corresponding to segment 301. Note that in FIG. 2, slope of waveshape segment 203 is essentially 1/(resistor 112 plus resistor R113); and slope of wave shape segment 201 is essentially 1/resistor 113.

Summarizing, several voltage ranges have been defined. Voltage range 309 is defined between beginning of discharge of capacitor 106 and beginning of turn-on of FET 115, and is a high voltage range. A medium voltage range is established between voltage corresponding to turn on of FET 115 and pinch off voltage of FET 115 and is depicted by voltage range 305. A low voltage range is depicted by voltage range 310 and corresponds to voltage between zero volts and pinch off voltage of FET 115.

In FIG. 3, lighter wave shape segment 304 is intended to represent continuation of discharge of capacitor 106 without effect of a quick discharge circuit. Level 308 represents a third voltage level below which capacitor 106 should discharge. Segment 304 and dashed line 313 intersect at a point more distant in time than the intersection of segment 301 and dashed line 313. The difference in time is represented by interval 307. A restartable voltage source such as restartable DC-DC converter 104 can be restarted automatically only if load voltage (voltage on capacitor 106) becomes less than a threshold voltage of the restartable source, such as voltage level 308.

Figure 4:
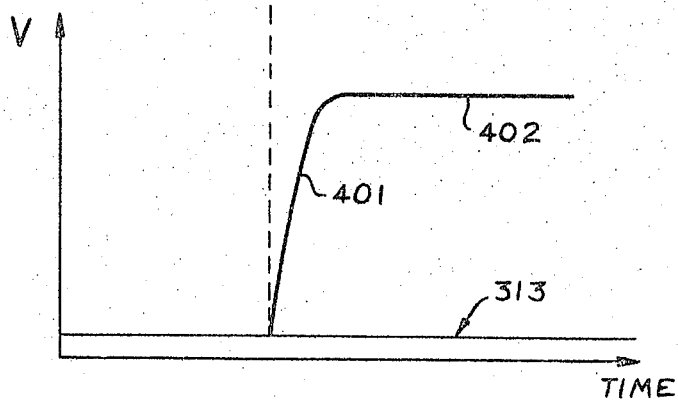
FIG. 4 depicts a voltage-time curve illustrating the return of a power supply to an operative status.

FIG. 4 depicts the charging of capacitor 106 after restartable DC-DC converter 104 begins to restart. Wave shape segment 401 indicates charging of capacitor 106 and segment 402 corresponds to a fully charged condition. Pacer operation begins at some point during charging of capacitor 106. Thus it is seen that the patient benefits since the pulse generator will start more quickly utilizing the present invention.

The following component values and model numbers are utilized in the preferred embodiments:

| Nuclear Cell | Hittman Corp.ATOMCELL ™ |
| Capacitor 106 | 0.1 micro farad |
| Resistor 112 | 4.7 megohm |
| Resistor 113 | 1.5 megohm |
| Resistor 114 | 3.3 megohm |
| FET 115 | N channel silicon junction Siliconix 2N4338 |

The invention may be embodied in yet other specific forms without departing from the spirit or essential characteristics thereof. For example, several nuclear cells may be used where the output voltage therefrom is too high, or perhaps a suitable nuclear cell will be developed that has a too-high output voltage; the DC-DC converter can thus be used to transformercouple downward rather than upward. Additionally, a P-channel FET could be utilized in place of FET 115 with suitable circuitry changes. Furthermore, other suitable switching components could replace FET 115. Thus, the present embodiments are to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An implantable pacer for stimulating the heart of a patient, said pacer comprising terminal means for connection to said patient's heart, pulse generating means for generating heart stimulating pulses on said terminal means, voltage source means for providing a first voltage level, means for converting said first voltage level to a second voltage level, means utilizing said second voltage level for energizing said pulse generating means, said energizing means including capacitor means, means for charging said capacitor means to said second voltage level, circuit means for providing a third voltage level below the lower of said first and said second levels, and quick discharge means for rapidly discharging said capacitor means to below said third voltage level when said converting means malfunctions.

2. A pacer as recited in claim 1 and wherein said voltage source means comprises at least one nuclear battery.

3. A pacer as recited in claim 1 and wherein said second voltage level is higher than said first voltage level.

4. A pacer as recited in claim 1 and wherein said quick discharge means comprises means for sensing voltage on said capacitor means, and means for establishing high, medium, and low voltage ranges and for providing a rapid discharge rate during said medium voltage range.

5. A pacer as recited in claim 4 wherein said capacitive means has positive and negative terminals and wherein said range establishing means comprises field-effect transistor means having source, drain, and gate terminals, means for extending said sensed voltage to said source terminal, means for conductively connecting said drain terminal to said positive terminal and for conductively connecting said gate terminal to said negative terminal.

6. A method for powering an implantable heart pacer with an implantable power supply, said supply including output capacitor means, said method comprising the steps of:
 a. generating a first voltage level;
 b. converting said first level to a second voltage level;
 c. charging said capacitor means towards said second level;
 d. utilizing said second level for energizing said pacer;
 e. establishing a third voltage level below the lower of said first and second levels;
 f. sensing the functioning of said supply by sensing voltage on said capacitor means;
 g. establishing high, medium, and low voltage ranges;
 h. controlling rate of discharge of said capacitor means during said medium voltage range to have a rapid discharge rate when said supply malfunctions; and
 i. determining voltage on said capacitor means being less than said third level for quickly and automatically restoring proper functioning of said supply.

7. A quick discharge circuit for use with a nuclear battery powered implantable heart pacer, said pacer comprising terminal means for connection to said patient's heart, pulse generating means for generating heart stimulating pulses on said terminal means, voltage source means for providing a first voltage level, means for converting said first voltage level to a second voltage level, means utilizing said second voltage level for energizing said pulse generating means, said energizing means including capacitor means, means for charging said capacitor means to said second voltage level, circuit means for providing a third voltage level below the lower of said first and second levels, and wherein said quick discharge circuit comprises means for rapidly discharging said capacitor means to below said third voltage level when said converting means malfunctions.

* * * * *